United States Patent
Sawai et al.

(10) Patent No.: US 10,403,893 B2
(45) Date of Patent: Sep. 3, 2019

(54) POSITIVE ELECTRODE MATERIAL FOR LITHIUM SECONDARY BATTERY

(71) Applicants: HYDRO-QUEBEC, Montreal, Quebec (CA); SEI CORP., Tsu, Mie (JP)

(72) Inventors: Takehiko Sawai, Tsu (JP); Shinji Saito, Tsu (JP); Kazunori Urao, Tsu (JP); Kazuma Hanai, Tsu (JP); Karim Zaghib, Longueuil (CA); Abdelbast Guerfi, Brossard (CA); Martin Dontigny, Varennes (CA)

(73) Assignees: HYDRO-QUEBEC, Montreal, Quebec (CA); SEI CORPORATION, Tsu, Mie Pref. (JP)

(*) Notice: Subject to any disclaimer, the term of this patent is extended or adjusted under 35 U.S.C. 154(b) by 331 days.

(21) Appl. No.: 14/913,234

(22) PCT Filed: Aug. 21, 2014

(86) PCT No.: PCT/CA2014/050803
§ 371 (c)(1),
(2) Date: Feb. 19, 2016

(87) PCT Pub. No.: WO2015/024127
PCT Pub. Date: Feb. 26, 2015

(65) Prior Publication Data
US 2016/0204424 A1    Jul. 14, 2016

Related U.S. Application Data

(60) Provisional application No. 61/868,296, filed on Aug. 21, 2013.

(51) Int. Cl.
*H01M 4/58* (2010.01)
*H01M 4/04* (2006.01)
(Continued)

(52) U.S. Cl.
CPC .......... *H01M 4/5825* (2013.01); *B60L 50/64* (2019.02); *C01B 25/45* (2013.01); *H01M 4/0402* (2013.01);
(Continued)

(58) Field of Classification Search
None
See application file for complete search history.

(56) References Cited

U.S. PATENT DOCUMENTS

2009/0087362 A1    4/2009  Sun et al.
2010/0075229 A1    3/2010  Atsuki et al.
(Continued)

FOREIGN PATENT DOCUMENTS

CA    2 830 111 A1    9/2012
CN    101308926 A    11/2008
(Continued)

OTHER PUBLICATIONS

Oljaca et al. (WO 2014/205215) (a raw machine translation) (Abstract) (Dec. 24, 2014) (Year: 2014).*
(Continued)

*Primary Examiner* — Carmen V Lyles-Irving
(74) *Attorney, Agent, or Firm* — Buchanan Ingersoll & Rooney P.C.

(57) ABSTRACT

A positive electrode material is used to produce a positive electrode of a lithium secondary battery, the positive electrode material being a composite lithium material that includes a first lithium compound and a second lithium compound. For instance, the first lithium compound is in the form of particles and comprises at least one compound selected from a layered lithium compound and a spinel-type lithium compound. Preferably, the second lithium compound comprises at least one compound selected from a lithium-containing phosphate compound and a lithium-con-
(Continued)

taining silicate compound. An amorphous carbon material layer and/or graphene-structured carbon material layer is present on the entire surface of the first lithium compound and the second lithium compound. The second lithium compound forms a thin-film layer on part or the entirety of the carbon material layer present on the surface of the first lithium compound particles.

28 Claims, 2 Drawing Sheets

(51) Int. Cl.
$H01M\ 4/136$ (2010.01)
$H01M\ 4/1391$ (2010.01)
$H01M\ 4/1397$ (2010.01)
$H01M\ 4/505$ (2010.01)
$H01M\ 4/525$ (2010.01)
$H01M\ 4/587$ (2010.01)
$H01M\ 4/66$ (2006.01)
$H01M\ 10/0525$ (2010.01)
$H01M\ 4/131$ (2010.01)
$H01M\ 4/36$ (2006.01)
$H01M\ 4/62$ (2006.01)
$H01M\ 10/0568$ (2010.01)
$H01M\ 10/0569$ (2010.01)
$C01B\ 25/45$ (2006.01)
$B60L\ 50/64$ (2019.01)
$H01M\ 4/02$ (2006.01)

(52) U.S. Cl.
CPC .......... $H01M\ 4/131$ (2013.01); $H01M\ 4/136$ (2013.01); $H01M\ 4/1391$ (2013.01); $H01M\ 4/1397$ (2013.01); $H01M\ 4/366$ (2013.01); $H01M\ 4/505$ (2013.01); $H01M\ 4/525$ (2013.01); $H01M\ 4/587$ (2013.01); $H01M\ 4/62$ (2013.01); $H01M\ 4/625$ (2013.01); $H01M\ 4/661$ (2013.01); $H01M\ 10/0525$ (2013.01); $H01M\ 10/0568$ (2013.01); $H01M\ 10/0569$ (2013.01); $C01P\ 2004/61$ (2013.01); $C01P\ 2004/80$ (2013.01); $H01M\ 2004/028$ (2013.01); $H01M\ 2220/10$ (2013.01); $H01M\ 2220/20$ (2013.01); $Y02T\ 10/705$ (2013.01); $Y02T\ 10/7011$ (2013.01)

(56) References Cited

U.S. PATENT DOCUMENTS

| | | | |
|---|---|---|---|
| 2010/0099027 A1 | 4/2010 | Kikuya et al. | |
| 2010/0119949 A1* | 5/2010 | Yano | H01M 4/13 252/182.1 |
| 2010/0203388 A1 | 8/2010 | Kim et al. | |
| 2011/0033746 A1 | 2/2011 | Liu et al. | |
| 2011/0292570 A1 | 12/2011 | Ivanovici et al. | |
| 2012/0085968 A1* | 4/2012 | Kawakami | C01B 25/37 252/182.1 |
| 2012/0088151 A1 | 4/2012 | Yamazaki et al. | |
| 2012/0210548 A1 | 8/2012 | Sawai et al. | |
| 2012/0258362 A1 | 10/2012 | Mah et al. | |
| 2013/0183579 A1* | 7/2013 | Kim | H01M 4/131 429/206 |
| 2013/0244112 A1 | 9/2013 | Oh et al. | |
| 2013/0309567 A1* | 11/2013 | Ogata | H01M 4/366 429/211 |
| 2014/0004421 A1 | 1/2014 | Chang et al. | |
| 2014/0087233 A1 | 3/2014 | Hong et al. | |
| 2015/0010798 A1 | 1/2015 | Sawai et al. | |

FOREIGN PATENT DOCUMENTS

| | | |
|---|---|---|
| CN | 102244263 A | 11/2011 |
| CN | 103208623 A | 7/2013 |
| EP | 2403041 A1 | 4/2012 |
| EP | 2618405 A2 | 7/2013 |
| JP | 2002175801 A | 6/2002 |
| JP | 2004-095426 A | 3/2004 |
| JP | 2008536285 A | 9/2008 |
| JP | 2011502332 A | 1/2011 |
| JP | 2011526732 A | 10/2011 |
| JP | 2012099468 A | 5/2012 |
| JP | 2013-69566 A | 4/2013 |
| JP | 2013149615 A | 8/2013 |
| JP | 2014518432 A | 7/2014 |
| WO | WO 2011/049153 A1 | 4/2011 |
| WO | 2012136473 A1 | 10/2012 |
| WO | WO 2013/128652 A1 | 9/2013 |
| WO | 2013166598 A1 | 11/2013 |

OTHER PUBLICATIONS

Oljaca et al. (WO 2014/205215) (a raw machine translation) (Detailed Description) (Dec. 24, 2014) (Year: 2014).*
Extended European Search Report dated Dec. 23, 2016, issued by the European Patent Office in corresponding European Application No. EP 14837607.2-1360. (7 pages).
International Search Report (PCT/ISA/210) dated Nov. 28, 2014, by the European Patent Office as the International Searching Authority for International Application No. PCT/CA2014/050803.
Written Opinion (PCT/ISA/237) dated Nov. 28, 2014, by the European Patent Office as the International Searching Authority for International Application No. PCT/CA2014/050803.
K. Zaghib et al., "New advanced cathode material: $LiMnPO_4$ encapsulated with $LiFePO_4$", Journal of Power Sources, Apr. 15, 2012, pp. 177-181, vol. 204.
Office Action (Tex of the First Office Action) dated Nov. 28, 2017, by the Chinese Patent Office in corresponding Chinese Patent Application No. 201480045979.2, and an English Translation of the Office Action. (17 pages).
Office Action (Notice of Reasons for Rejection) dated Apr. 19, 2018, by the Japanese Patent Office in Japanese Patent Application No. 2016-535264, and an English Translation of the Office Action. (10 pages).

* cited by examiner

POSITIVE ELECTRODE MATERIAL FOR LITHIUM SECONDARY BATTERY

RELATED APPLICATION

This application claims priority to U.S. provisional application No. 61/868,296 filed Aug. 21, 2013, the content of which is incorporated herein by reference in its entirety for all purposes.

FIELD OF THE INVENTION

The invention relates to a positive electrode material for a lithium secondary battery. For instance, the invention relates to a positive electrode material for a lithium secondary battery that is to be used as a vehicle battery.

BACKGROUND OF THE INVENTION

In recent years, lithium secondary batteries including positive and negative electrodes formed using a material that allows insertion and extraction of lithium ions, which were developed, aimed at on-vehicle applications. It has been a great challenge to implement a lithium secondary battery that achieves high energy density, high output (large-current charge/discharge), long lifetime, and high safety.

Various solutions such as (1) improvements in positive/negative electrode material (Japanese Patent No. 3867030, Sei KK); (2) improvements in the collector foil (WO2011/049153, SEI Corporation); and (3) improvements in the separator (PCT/JP2012/056998) have been proposed to implement such a lithium secondary battery. The content of each of these three documents is incorporated herein by reference in its entirety for all purposes.

Energy density and output of a lithium secondary battery were improved, for example, by reducing the particle size of positive/negative electrode active material particles, increasing the specific surface area of positive/negative electrode active material particles via surface modification or the like, or increasing the electrode area by improving the electrode design. Although these measures have opened the door to a possibility to implement a lithium secondary battery aimed at on-vehicle applications, the improvement in energy density, safety, and lifetime is currently insufficient.

Extensive research and development have been conducted in order to achieve higher energy density. For example, an increase in charge voltage of an Ni-rich LNMC (Li(Ni/Mn/Co)O$_2$) positive electrode material, use of a sulfur compound having high theoretical energy density as a positive electrode material, and use of an alloy-based negative electrode material (or an oxide thereof) having semiconductor properties have been proposed. Lithium-air batteries have also been proposed as novel lithium batteries.

A Li(Ni/Mn/Co)O$_2$/LiFePO$_4$ mixed battery has also been proposed in the Abstracts of 53$^{rd}$ Battery Symposium in Japan (p. 40, November 2012), Committee of Battery Technology, Electrochemical Society of Japan, incorporated herein by reference in its entirety.

The initial energy density of a lithium battery can temporarily be increased by the above means. However, it is difficult to implement the cycle life of 5,000 to 10,000 cycles (10 years) required for vehicle applications which necessitate maintaining a high energy density.

A Ni-rich LNMC positive electrode material achieves long constant-current discharge, but does not exhibit flat voltage characteristics (i.e., generally exhibits voltage characteristics that decrease from the high-voltage region). An on-vehicle battery should exhibit flat voltage characteristics from the viewpoint of quality, high output and high energy density, which characteristics cannot be practically achieved when using a Ni-rich LNMC positive electrode material. More specifically, since an on-vehicle battery is used at a constant power, it is impossible to use an on-vehicle battery up to a considerable discharge depth.

A mixed battery can initially prevent a decrease in output due to the mixed potential, but shows a decrease in output as the number of charge-discharge cycles increases since the reaction site is concentrated on an active material having low resistance.

A lithium battery with improved properties, while avoiding the drawbacks of the preceding examples, for an on-vehicle battery is thus desirable.

SUMMARY OF THE INVENTION

An object of the invention is to provide a lithium secondary battery positive electrode material that can achieve the high energy density and high output required for on-vehicle applications, and can be applicable to mass production.

In one aspect, the positive electrode material is a composite lithium material which includes a first lithium compound in the form of particles, a thin layer of a second lithium compound and a carbon material layer in between.

The first lithium compound comprises at least one compound selected from a layered lithium compound, a spinel-type lithium compound or a combination thereof. The layered lithium compound may be α-layered Li(Ni$_α$/Mn$_β$/Co$_γ$)O$_2$ (wherein α+β+γ=1). The spinel-type lithium compound may be spinel-type LiNi$_δ$Mn$_ε$O$_4$ (wherein δ+ε=2). A compound that includes an element among the elements of groups 3 to 6 of the periodic table, or an oxide thereof, or an aluminum halide compound may be present on the surface of the particles of the layered lithium compound and/or spinel-type lithium compound. For example, an element within groups 3 to 6 of the periodic table may be selected from aluminum, molybdenum, titanium, zirconium, and sulfur.

Note that the expression "α+β+γ=1" means that the total number of moles of Ni, Mn, and Co atoms is 1, and the expression "δ+ε=2" means that the total number of moles of Ni and Mn atoms is 2. The above definition is similarly applied to the expressions "ζ+η+θ=1" and "ι+κ+λ=1" below. It the foregoing definitions, each of α, β, γ, δ, ε, ζ, η, θ, ι, κ, and λ may be a positive integer (i.e. a whole number), a positive fraction, or may be zero (0), given that the given formula in which it appears is satisfied.

The second lithium compound comprises at least one compound selected from a lithium-containing phosphate compound, a lithium-containing silicate compound and combinations thereof. The lithium-containing phosphate compound may be of olivine-type Li(Fe$_ζ$/Co$_η$/Mn$_θ$)PO$_4$ (wherein ζ+η+θ=1). The lithium-containing silicate compound may be Li(Fe$_ι$/Co$_κ$/Mn$_λ$)SiO$_4$ (wherein ι+κ+λ=1).

A carbon material layer selected from an amorphous carbon material layer, a graphene-structured carbon material layer or a combination thereof is present on the entire surface of the first lithium compound and the second lithium compound. The first lithium compound is in the form of particles, and the second lithium compound forms a thin-film layer on part or the entirety of the carbon material layer surface of the covered first lithium compound particles. According to one aspect, a second carbon material layer is present on the entire surface of the second lithium compound opposite to the surface in contact with the carbon material layer covering the first lithium compound particles.

The lithium secondary battery positive electrode material may further include a conductive carbon material, together with the first lithium compound and the second lithium compound that are entirely covered with the carbon material layer, and the second carbon material layer and the surface layer of the conductive carbon material may be fusion-bonded.

According to another aspect, the invention provides a lithium secondary battery comprising at least one lithium secondary battery positive electrode as defined in any of the foregoing embodiments, at least one lithium secondary battery negative electrode, at least one separator between positive and negative electrodes, and an electrolyte.

For instance, the invention provides a lithium secondary battery positive electrode material adapted for use in the production of a positive electrode of a lithium secondary battery. The battery is configured in such a manner that at least one positive electrode and at least one negative electrode are wound or stacked through separators, and are infiltrated with or immersed in an organic electrolyte solution so that insertion and extraction of lithium ions occur repeatedly.

According to a further aspect, the invention provides a method for the manufacture of a lithium secondary battery positive electrode material comprising the steps of a) providing particles of a first lithium compound, e.g. selected from a layered lithium compound, a spinel-type lithium compound, and combinations thereof; b) forming a first carbon material layer on the particles provided in (a), the carbon material being preferably selected from an amorphous carbon material layer, a graphene-structured carbon material layer, or a combination thereof, to provide carbon-coated particles; c) forming a thin film layer of a second lithium compound on part or the entirety of the carbon-coated particles provided in step (b), the second lithium compound being selected from, e.g. a lithium-containing phosphate compound, a lithium-containing silicate compound, and combinations thereof; and d) coating the thin film layer of the second lithium compound with a second carbon material layer present on an entire surface, wherein the carbon material is preferably selected from an amorphous carbon material layer, a graphene-structured carbon material layer, or a combination thereof.

According to yet another aspect, the invention provides a method for the manufacture of a lithium secondary battery. According to yet another aspect, the invention also contemplates the use of a lithium secondary battery of the invention in replacement of lithium-ion batteries and in systems demanding high energy rechargeable batteries, and for example, as industrial batteries, as on-vehicle batteries (e.g. electric or hybrid vehicles), and in ubiquitous IT devices.

DETAILED DESCRIPTION OF PREFERRED EMBODIMENTS

The following detailed description and examples are for illustrative purposes and should not be construed as further limiting the scope of the invention.

It is considered that previous $Li(Ni/Mn/Co)O_2/LiFePO_4$ mixed batteries show a decrease in output since the crystal structure of $Li(Ni/Mn/Co)O_2$ deteriorates, and the network of the conductive material is destroyed (i.e., reaction sites become non-uniform) as the number of charge-discharge cycles increases.

Specifically, an oxide having a layered structure (e.g., $Li(Ni/Mn/Co)O_2$) or a spinel-type compound allow repeated insertion and extraction of lithium ions to achieve charge and discharge. In contrast, a phosphate compound (e.g., $LiFePO_4$) or a silicate compound is essentially an ion-binding compound. In this case, the insertion and extraction of lithium ions is believed to occur via a mechanism that differs from that of an oxide having a layered structure or a spinel-type compound. For example, it has recently been found that $LiFePO_4$ (powder) allows insertion and extraction of lithium ions through the crystal structure of the surface area of the powder, and the lithium ion diffusion rate inside the powder is considered relatively low.

When positive electrode materials that differ in lithium ion insertion/extraction mechanism are merely mixed, the characteristics of each positive electrode material are observed. Therefore, when implementing an on-vehicle battery for which high output is required, reaction control occurs due to $LiFePO_4$, resulting in a decrease in output.

It was found that a battery that can, for instance, maintain high output over a wide voltage range and/or exhibit high energy density can be obtained by using an oxide having a layered structure or a spinel-type compound as a particulate first lithium compound, forming a first carbon material layer on the surface of the particulate first lithium compound, and forming a thin-film layer of a lithium-containing phosphate compound or silicate compound (second lithium compound) on the first carbon material layer. One hypothesis would include the particles of the first lithium compound serving as a reaction site in a high-voltage region, and the thin-film layer of the second lithium compound having a relatively low oxidation-reduction potential serving as a reaction site in a low-voltage region during charge and discharge. It was found that an on-vehicle battery can maintain high output by forming a thin-film layer of the second lithium compound so that a decrease in output does not occur, and insertion and extraction of lithium ions in the reaction site are not limited.

Figure 1:
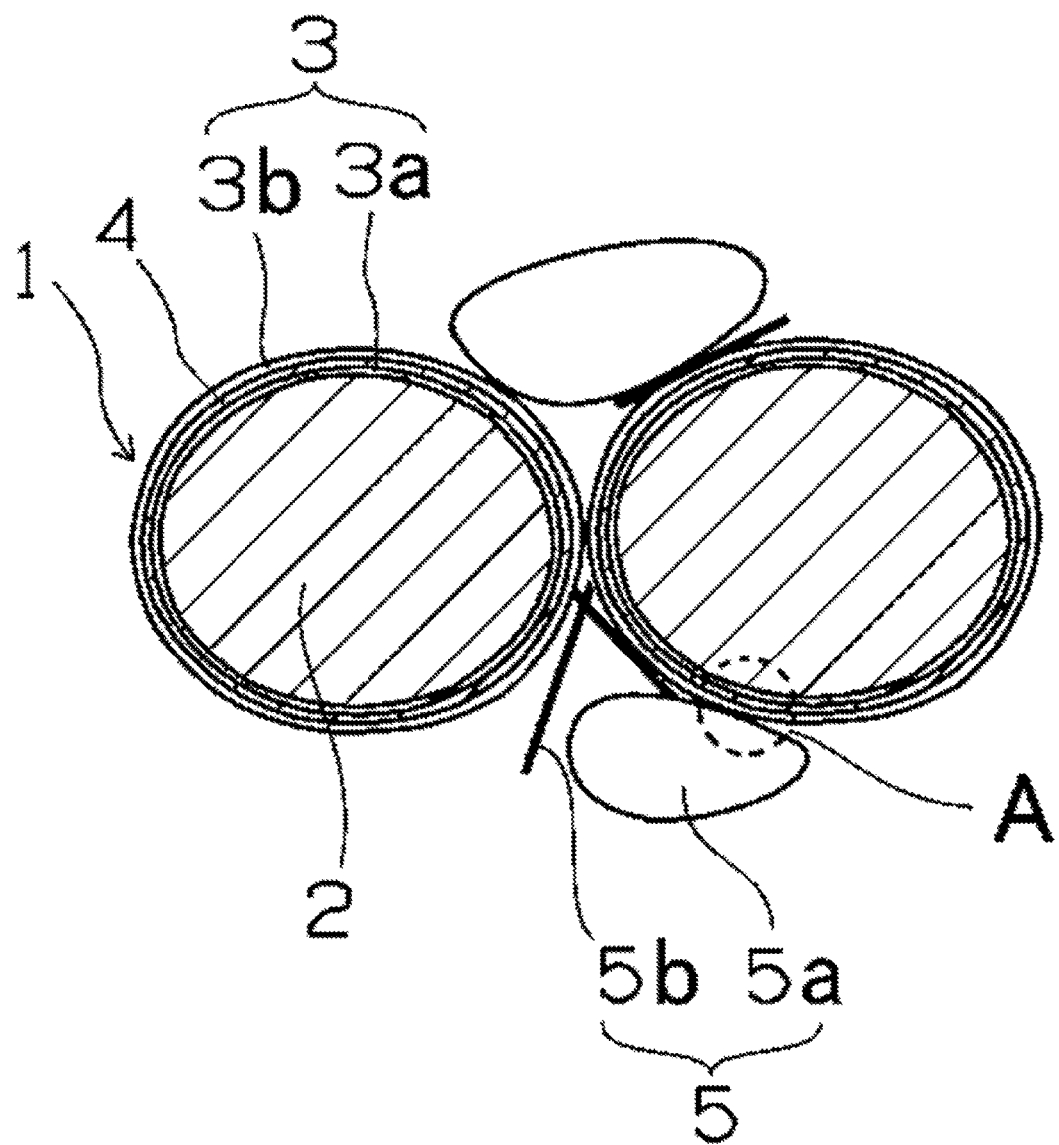
FIG. 1 is a schematic view illustrating an example of a positive electrode material according to the invention.
Figure 2:
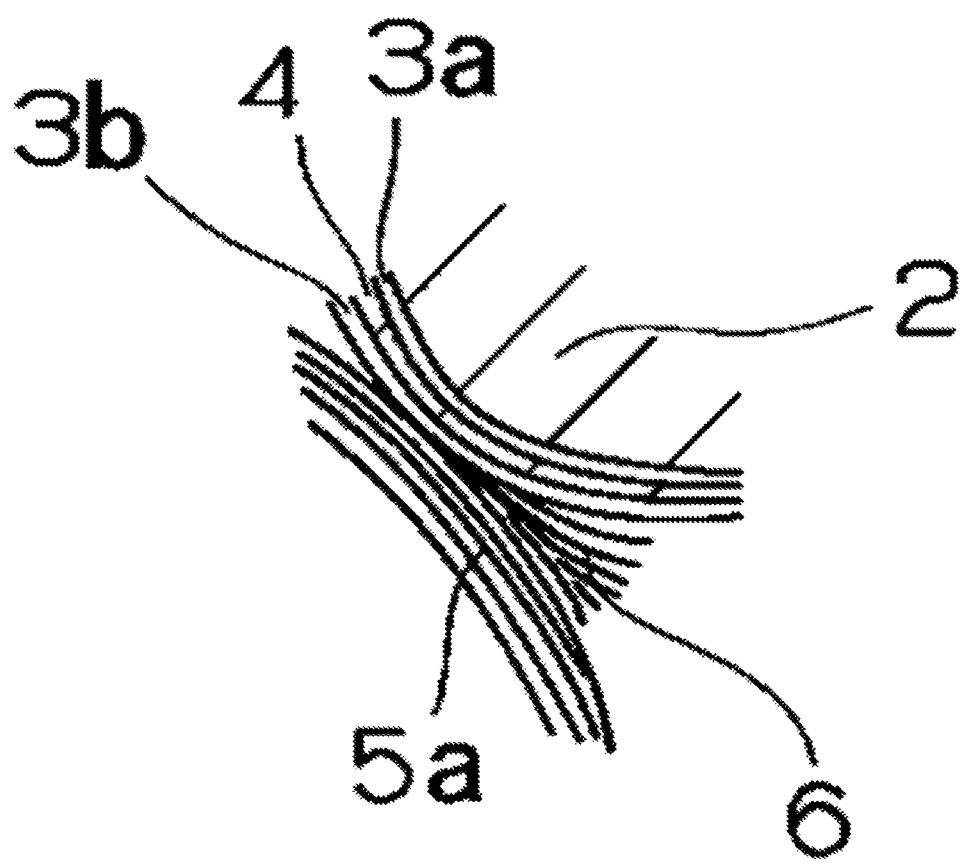
FIG. 2 is an enlarged view of area A from FIG. 1.

FIG. 1 is a schematic view illustrating an example of a positive electrode material according to one embodiment of the invention. FIG. 2 is an enlarged view of the area A in FIG. 1.

A positive electrode material 1 is configured such that a layer of a first carbon material (amorphous and/or graphene-structured) 3a is formed on the surface of a particulate first lithium compound 2 that serves as a nucleus or core, a thin-film layer of a second lithium compound 4 is formed on the surface of the layer of carbon material 3a, and the thin-film layer of the second lithium compound 4 is further covered with a layer of carbon material 3b.

In the embodiment shown in FIG. 1, the positive electrode material 1 further includes a conductive carbon material 5 together with the first lithium compound 1 in the form of a particle and the second lithium compound 4 in the form of a thin film that are each entirely covered with the layers of carbon material 3. The layer of carbon material 3b and the surface layer of the conductive carbon material 5 are fusion-bonded. The conductive carbon material 5 is at least one material selected from a conductive carbon powder 5a and a conductive carbon fiber 5b.

The conductive carbon powder 5a is preferably at least one powder selected from acetylene black, ketjen black, and a powder that partially includes a graphite crystal. The conductive carbon fiber 5b is preferably at least one fiber selected from a carbon fiber, a graphite fiber, a vapor-grown carbon fiber, a carbon nanofiber, and a carbon nanotube. The diameter of the carbon fiber is preferably 5 to 200 nm, and more preferably 10 to 100 nm. The length of the carbon fiber is preferably 100 nm to 50 μm, and more preferably 1 to 30 μm.

The expression "the layers of carbon material 3b and the surface layer of the conductive carbon material 5 are fusion-bonded" means, for instance, that graphene-structured layers 6 (see FIG. 2) present on the surface of the carbon material layer 3b and the surface of the conductive carbon material 5 overlap each other. This makes electrical conductivity improvements possible. The layer of the carbon material 3b and the surface layer of the conductive carbon material 5 may be fusion-bonded by mixing the carbon material 3b and the conductive carbon material 5, and calcining the mixture.

When mixing a carbon source (e.g., lactose) to effect partial graphitization, and then implementing reliable fusion bonding, it is preferable to apply a dry mechanochemical method after calcining the mixture. When a carbon source is not used, fusion bonding can be implemented by a calcination method since the calcination temperature is close to the carbon-carbon bond cleavage temperature. In contrast, it is preferable to apply a mechanochemical method when mixing a carbon source.

The average particle size of the first lithium compound particles 2 ranges from about 3 to about 15 μm. The thickness of the carbon material layer 3a formed on the surface of the particles of the first lithium compound 2 ranges from about 1 nm to about 10 nm, and preferably from about 2 nm to about 5 nm. If the thickness of the carbon material layer 3a exceeds 10 nm, lithium ions may not be sufficiently diffused into the surface of the active material, i.e. at the reaction site. As a result, the output characteristics of the lithium battery may deteriorate. The thickness of the second lithium compound layer 4 is, for example, within the range of about 50 nm to about 300 nm.

The first lithium compound 2 is a particulate compound that serves as a nucleus, or core, for the electrode material. The first lithium compound is preferably a layered lithium compound, a spinel-type lithium compound, or a mixture of a layered lithium compound and a spinel-type lithium compound.

For example, the layered lithium compound is an intercalation compound in which lithium is incorporated in a molecular host in which $CoO_2$ sheets formed by ridge sharing of $CoO_6$ octahedrons are stacked. The layered lithium compound that may be used in connection with the embodiments of the invention is represented by α-layered $Li(Ni_\alpha/Mn_\beta/Co_\gamma)O_2$, wherein $\alpha+\beta+\gamma=1$.

The spinel-type lithium compound may be a lithium-containing metal oxide having a spinel structure, for example, represented by $LiNi_\delta Mn_\varepsilon O_4$, wherein $\delta+\varepsilon=2$.

Specific examples of the layered lithium compound and the spinel-type lithium compound include $LiCoO_2$, $Li(Ni/Mn/Co)O_2$, $Li(Ni_{0.5}/Mn_{1.5})O_4$, $LiMn_2O_4$, $Li_2MO_3\text{-}LiMO_2$ (wherein M=Ni, Co, or Mn) (solid solution), and the like. For instance, the use of $Li(Ni/Mn/Co)O_2$ or $Li(Ni_{0.5}/Mn_{1.5})O_4$ may be preferred from a viewpoint of electrochemical characteristics, safety, and cost.

In one embodiment, a compound including an element selected from the elements of groups 3 to 6 of the periodic table of elements, or an oxide thereof, or an aluminum halide compound is present on the surface of the particles of the first lithium compound, e.g. layered or spinel-type lithium compound. When the above compound is present in the crystal lattice site of the surface of the layered lithium or spinel-type lithium compound, the resistance of Mn-based material can be reduced. Compounds containing an element selected from groups 3 to 6 of the periodic table of elements are, for example, compounds that include an element selected from Al, Mo, Ti, Zr, and S. Examples of aluminum halide compounds include aluminum fluoride. Preferably, the surface of the particles of the layered lithium or spinel-type lithium compound is doped with aluminum fluoride or the like in a ratio of about 1% to about 3% (by weight).

The second lithium compound 4 forms a thin film on the surface of the particles of the first lithium compound 2 through the layer of carbon material 3a. The second lithium compound is, for example, a lithium-containing phosphate compound, a lithium-containing silicate compound, or a mixture of a lithium-containing phosphate compound and a lithium-containing silicate compound. For example, a lithium-containing phosphate compound may be represented by olivine-type $Li(Fe_\zeta/Co_\eta/Mn_\theta)PO_4$ (wherein $\zeta+\eta+\theta=1$). A lithium-containing silicate compound may be represented by, for instance, $Li(Fe_\iota/Co_\kappa/Mn_\lambda)SiO_4$ (wherein $\iota+\kappa+\lambda=1$).

Specific examples of such compounds include $LiFePO_4$, $LiCoPO_4$, $LiMnPO_4$, $LiFe_\zeta Mn_\theta PO_4$ (wherein $\zeta+\theta=1$), and the like. Among these, $LiFePO_4$ is preferable from the viewpoint of the effects achieved when used in combination with the first lithium compound.

Examples of a combination of the first lithium compound and the second lithium compound include a combination of $Li(Ni_\alpha/Mn_\beta/Co_\gamma)O_2$ (wherein $\alpha+\beta+\gamma=1$) and $LiFePO_4$, a combination of $Li(Ni_{0.5}/Mn_{1.5})O_4$ and $LiFePO_4$, a combination of $Li(Ni_\alpha/Mn_\beta/Co_\gamma)O_2$ (wherein $\alpha+\beta+\gamma=1$) and $Li(Fe_\zeta/Mn_\theta)PO_4$ (wherein $\zeta+\theta=1$), a combination of $Li(Ni_{0.5}/Mn_{1.5})O_4$ and $Li(Fe_\zeta/Mn_\theta)PO_4$ (wherein $\zeta+\theta=1$), and the like.

The entire surface of the first lithium compound and the second lithium compound is covered with the carbon material layer (amorphous and/or graphene-structured carbon). Specifically, the first lithium compound and the second lithium compound do not come in direct physical contact with each other (i.e. physically isolated), but are in indirect contact with each other through the first carbon material layer.

Examples of methods for forming the second lithium compound layer on the surface of the first lithium compound that is covered with the carbon material layer include a vacuum CVD method, a wet sol-gel method, a dry mechanochemical method, a mechanofusion method, and the like.

Examples of negative electrode materials for the lithium battery include artificial graphite, composite negative electrode materials which include metallic silicon, and the like. A high capacity, high regeneration, and a long lifetime may be implemented by utilizing a negative electrode material prepared by coating the surface of a silicon oxide powder that includes metallic silicon with conductive carbon, forming a composite of the resulting powder and a graphitic powder (artificial graphite or graphitizable powder) of which the surface is coated with conductive carbon, and bonding the composite and conductive carbon (e.g., acetylene black or carbon nanotubes).

A separator is provided between the positive electrode and the negative electrode to electrically insulate the two electrodes from each other, and to retain the electrolyte solution. The separator includes, for example, a synthetic resin film, a separator formed of fibers or inorganic fibers, and the like. Specific examples of separators include a polyethylene film, a polypropylene film, a polyethylene woven fabric, a polyethylene nonwoven fabric, a polypropylene woven fabric, a polypropylene nonwoven fabric, a separator formed of glass fibers, a separator formed of cellulose fibers, a separator formed of polyethylene terephthalate fibers, and the like.

A non-aqueous electrolyte solution which includes a lithium salt, an ion-conductive polymer, or the like is preferably used as the electrolyte solution of the lithium secondary battery in which the positive electrode and the negative electrode are immersed. An ion-conductive solid polymer layer may also replace the separator and electrolyte solution in a solid state battery.

Examples of the non-aqueous solvent included in the non-aqueous electrolyte solution that includes a lithium salt include ethylene carbonate (EC), propylene carbonate (PC), diethyl carbonate (DEC), dimethyl carbonate (DMC), methylethyl carbonate (MEC), and the like, or a combination of two or more of any of the foregoing non-aqueous solvents.

Examples of lithium salts which can be dissolved in the non-aqueous solvent include lithium hexafluorophosphate ($LiPF_6$), lithium tetrafluoroborate ($LiBF_4$), lithium trifluoromethanesulfonate ($LiSO_3CF_3$), and the like, or combinations thereof.

The lithium secondary battery electrode material according to one embodiment of the invention may include a binder which is physically and chemically stable in the battery's internal conditions. Examples of binders include fluorine-containing resins such as polytetrafluoroethylene, polyvinylidene fluoride, and fluororubber, and thermoplastic resins such as polypropylene and polyethylene. Further examples of binders include acrylic resin materials, styrene-butadiene-based materials, and the like.

The lithium secondary battery electrode includes the above electrode material and an optional additional member. Examples of such additional member include a collector to collect current from the electrode material. Examples of collectors include a thin metal film. A positive electrode collector is, for example, an aluminum foil. A negative electrode collector is, for example, a copper foil.

Since the first lithium compound on which the first carbon material layer (amorphous and/or graphene-structured) is present is in the form of particles, and the second lithium compound forms a thin-film layer on part or the entirety of the surface of the particles of the first lithium compound, the particles of the first lithium compound serve as a reaction site in a high-voltage region, and the thin-film layer of the second lithium compound having a relatively low oxidation-reduction potential serves as a reaction site in a low-voltage region during charge and discharge. Therefore, it is possible to implement a battery including a lithium secondary battery positive electrode material according to one aspect of the invention which can maintain high output over a wide voltage range, and exhibits high energy density.

When a compound which includes an element among the elements of groups 3 to 6 in the periodic table, or an oxide thereof, or an aluminum halide compound is present on the surface of the particles of the first lithium compound, it is possible to reduce the resistance of a Mn-based material, and potentially prevent a situation in which the first lithium compound would crystallize or break during charge and discharge due to an increase in voltage.

When the lithium secondary battery positive electrode material further includes a conductive carbon material together with the first lithium compound and the second lithium compound that are entirely covered with the first and second carbon material layers (amorphous and/or graphene-structured carbon), and the second carbon material layer and the surface layer of the conductive carbon material are fusion-bonded, it is possible to prevent the destruction of the electronic conduction network due to expansion and contraction of the electrode during charge and discharge, thereby achieving a long lifetime. The olivine-type material does not easily undergo deoxidation, and may significantly contribute to preventing thermal runaway of a battery, thereby improving the safety of the lithium secondary battery.

EXAMPLES

Example 1

$Li(Ni_{1/3}/Co_{1/3}/Mn_{1/3})O_2$ was provided as the lithium secondary battery positive electrode material. $Li(Ni_{1/3}/Co_{1/3}/Mn_{1/3})O_2$ was in the form of particles having an average particle size of 5 to 8 μm, and ceramic particles (e.g., $AlF_3$) were provided on the surface of the $Li(Ni_{1/3}/Co_{1/3}/Mn_{1/3})O_2$ particles in order to prevent generation of gas and the like.

The surface of the $Li(Ni_{1/3}/Co_{1/3}/Mn_{1/3})O_2$ particles was coated with a graphitizable resin, and calcined at 400 to 500° C. (at which the compound did not decompose) to cover the surface of the $Li(Ni_{1/3}/Co_{1/3}/Mn_{1/3})O_2$ particles with an amorphous carbon layer having a thickness of 2 to 5 nm.

A $LiFePO_4$ thin film was formed on the surface of the amorphous carbon layer by a solid-phase method by heating iron oxalate and lithium phosphate at 600 to 650° C. in an argon gas atmosphere under normal pressure to produce a composite lithium material. The thickness of the thin film was 200 nm, and the ratio of the thin film was 20% (by weight).

An amount of 84 parts by weight of the composite lithium material, and a mixture of 8 parts by weight of conductive carbon and 2 parts by weight of conductive carbon fibers (conductive material), were mixed in a lactose aqueous solution, dried, and calcined at 400 to 500° C. The surface layer of the composite lithium material and the surface layer of the conductive material were then fusion-bonded by mechanofusion, using the heat generated by shear forces between powders at the carbon material interface.

An amount of 6 parts by weight of polyvinylidene fluoride (binder) was added to the resulting positive electrode material. After the addition of N-methylpyrrolidone (dispersion solvent), the mixture was kneaded to prepare a positive electrode slurry. The slurry was applied to an aluminum foil having a thickness of 20 μm to obtain a positive electrode having a thickness of 160 μm (including the aluminum foil).

A negative electrode provided opposite to the positive electrode was obtained as described below. A negative electrode material (artificial graphite), a conductive material, a carboxymethyl cellulose (CMC) aqueous solution, and a styrene-butadiene-based material (SBR) solution (binder) were mixed to prepare a slurry. The slurry was applied to a 10 μm copper foil to obtain a negative electrode having a thickness of 100 μm (including the copper foil).

The positive electrode and the negative electrode were cut to predetermined dimensions. Five positive electrodes and six negative electrodes were stacked, nonwoven fabric separators separating each of the positive and negative electrodes. After welding a terminal, the electrodes were wrapped with a laminate film to obtain a laminated battery. A solution prepared by dissolving lithium hexafluorophosphate ($LiPF_6$) in a solvent mixture containing ethylene carbonate (EC), dimethyl carbonate (DMC), and diethyl carbonate (DEC) at a concentration of 1 mol/L was used as electrolyte solution. A polyethylene (PE) resin film having a thickness of 40 µm was used as separator. After injecting the electrolyte solution, the laminate film was sealed by welding, and the battery was charged to obtain a 3.6 V-700 mAh lithium battery.

A cycle test was performed using the resulting battery (1 cycle: 1.5 W constant-power discharge, 2.5 V cut-off, and 4.1 V (700 mA) CC/CV charge). Table 1 shows the measurement results for the ratio (Wh retention ratio) of the 1000th cycle Wh capacity to the initial Wh capacity.

Example 2

A positive electrode was produced in the same manner as in Example 1, except that $Li(Ni_{0.5}/Mn_{1.5})O_4$ was used instead of $Li(Ni_{1/3}/Co_{1/3}/Mn_{1/3})O_2$. A laminated lithium battery was produced as in Example 1 using the resulting positive electrode and a negative electrode also produced as in Example 1. The resulting lithium battery was a 4.5 V-600 mAh lithium battery.

A cycle test was performed using the resulting battery (1 cycle: 3.0 W constant-power discharge, 2.7 V cut-off, and 4.8 V (600 mA) CC/CV charge). Table 1 shows the measurement results for the ratio (Wh retention ratio) of the 1000th cycle Wh capacity to the initial Wh capacity.

Comparative Example 1

The surface of $Li(Ni/Co/Mn)O_2$ particles was covered with the amorphous carbon layer in the same manner as in Example 1. A $LiFePO_4$ powder was provided, and was merely mixed with the $Li(Ni/Co/Mn)O_2$ particles and the conductive material to obtain a positive electrode. The mixing ratio (weight ratio) of each component was the same as that employed in Example 1. A laminated lithium battery was produced in the same manner as in Example 1 using the resulting positive electrode and a negative electrode that was produced in the same manner as for Example 1. The resulting lithium battery was a 3.8 V-700 mAh lithium battery.

A cycle test was performed in the same manner as Example 1 using the resulting battery. Table 1 shows the measurement results for the ratio (Wh retention ratio) of the 1000th cycle Wh capacity to the initial Wh capacity.

Comparative Example 2

The surface of $Li(Ni_{0.5}/Mn_{1.5})O_4$ particles was covered with an amorphous carbon layer in the manner accomplished in Example 1. A $LiFePO_4$ powder was provided, and was merely mixed with the $LiNi_{0.5}/Mn_{1.5}O_4$ particles and the conductive material to obtain a positive electrode material. The mixing ratio (weight ratio) of each component was the same as that employed in Example 2. A laminated lithium battery was produced in the same manner as in Example 1 using the resulting positive electrode and a negative electrode that was also produced in the same manner as for Example 1. The resulting lithium battery was a 4.1 V-500 mAh lithium battery.

A cycle test was performed in the same manner as in Example 1 using the resulting battery. Table 1 shows the measurement results for the ratio (Wh retention ratio) of the 1000th cycle Wh capacity to the initial Wh capacity.

TABLE 1

Ratio (%) of Wh capacity at $1000^{th}$ cylcle to initial Wh capacity

| | Example | | Comparative Example | |
|---|---|---|---|---|
| | 1 | 2 | 1 | 2 |
| Wh retention ratio (%) | 96 | 92 | 73 | 66 |

The results shown in Table 1 confirmed that the lithium batteries of Examples 1 and 2 in which the $LiFePO_4$ thin film was formed on the surface of the core material, could maintain a mixed potential continuity without showing reaction control due to $LiFePO_4$, as compared with the lithium batteries of Comparative Examples 1 and 2 in which the electrode materials were merely mixed in the same mixing ratio. The lithium batteries of Comparative Examples 1 and 2 could initially prevent a decrease in output (SOC) due to the mixed potential, but showed a decrease in output as the crystal structure of $Li(Ni/Mn/Co)O_2$ deteriorated, and the network of the conductive material was destroyed (i.e., reaction sites became non-uniform) as the number of charge-discharge cycles increased. As a result, the mixed potential continuity was lost, and a decrease in output occurred.

Similar effects were obtained when using a layered compound having a different element mixing ratio, or using an olivine-type compound including Co and/or Mn instead of Fe, or using a silicic acid compound instead of a phosphate compound.

The lithium secondary battery electrode material according to the embodiments of the invention renders possible the implementation of a lithium secondary battery that, for instance, exhibits high output and high energy density, has a cycle life of 5000 to 10,000 cycles (10 years), and may be used as an industrial battery (e.g., on-vehicle battery).

REFERENCE NUMBERS LIST

1 Positive electrode material
2 First lithium compound
3 Carbon material layers (amorphous and/or graphene-structured carbon)
   3a First carbon material layer
   3b Second carbon material layer
4 Second lithium compound
5 Conductive carbon material
   5a Conductive carbon powder material
   5b Conductive carbon fiber material
6 Graphene-structured layer.

The invention claimed is:
1. A positive electrode material being a composite lithium material comprising:
a first lithium compound in the form of particles, the first lithium compound comprising a layered lithium compound, a spinel-type lithium compound, or a combination thereof, wherein the first lithium compound forms a core;
a first carbon material layer present on an entire surface of the first lithium compound particles, wherein the first carbon material layer forms a first shell on the core;
a second lithium compound forming a thin-film layer on part or the entirety of a surface of the first carbon material layer, the second lithium compound comprising a lithium-containing phosphate compound, a lithium-containing silicate compound, or a combina- tion thereof, wherein the second lithium compound thin-film layer forms a second shell on the first shell; and a second carbon material layer present on an entire surface of the thin film layer of the second lithium compound, wherein the second carbon material layer forms a third shell on the second shell, wherein the carbon material of the first and second carbon material layers is independently selected from amorphous carbon material, graphene-structured carbon material, or a combination thereof; and wherein the first and second lithium compounds are not in direct physical contact.

2. The positive electrode material according to claim 1, wherein the first lithium compound comprises an α-layered $Li(Ni_\alpha/Mn_\beta/Co_\gamma)O_2$, wherein $\alpha+\beta+\gamma=1$, a spinel-type $Li(Ni_\delta/Mn_\epsilon)O_4$, wherein $\delta+\epsilon=2$, or a combination thereof.

3. The positive electrode material according to claim 1, further comprising a compound that includes an element selected from the elements of groups 3 to 6 of the periodic table, or an oxide thereof, or an aluminum halide compound, said compound being present on the surface of the particles of the first lithium compound.

4. The positive electrode material according to claim 3, wherein the element selected from the elements of groups 3 to 6 of the periodic table is aluminum, molybdenum, titanium, zirconium, or sulfur.

5. The positive electrode material according to claim 3, wherein the aluminum halide compound is aluminum fluoride.

6. The positive electrode material according to claim 1, wherein the second lithium compound comprises olivine-type $Li(Fe_\zeta/Co_\eta/Mn_\theta)PO_4$, wherein $\zeta+\eta+\theta=1$, $Li(Fe_\iota/Co_\kappa/Mn_\lambda)SiO_4$, wherein $\iota+\kappa+\lambda=1$, or a combination thereof.

7. The positive electrode material according to claim 1, further comprising a conductive carbon material, wherein the second carbon material layer and a surface layer of the conductive carbon material are fusion-bonded.

8. The positive electrode material according to claim 7, wherein the conductive carbon material comprises at least one conductive carbon material selected from conductive carbon powders and conductive carbon fibers.

9. The positive electrode material according to claim 8, wherein the conductive carbon powder comprises at least one powder selected from acetylene black, ketjen black, and a powder that partially includes a graphite crystal.

10. The positive electrode material according to claim 8, wherein the conductive carbon fiber comprises at least one fiber selected from carbon fibers, graphite fibers, vapor-grown carbon fibers, carbon nanofibers, and carbon nanotubes.

11. A positive electrode comprising a positive electrode material as defined in claim 1 and a current collector.

12. The positive electrode of claim 11, further comprising a binder.

13. The positive electrode of claim 12, wherein the binder is selected from fluorine-containing resins, thermoplastic resins, acrylic resin materials, styrene-butadiene-based materials, and combinations thereof.

14. A lithium secondary battery comprising at least one positive electrode as defined in claim 11, at least one negative electrode and at least one electrolyte, optionally further comprising at least one separator in between stacked positive and negative electrodes, and an electrolyte solution in which the positive and negative electrodes are immersed.

15. The lithium secondary battery according to claim 14, wherein the negative electrode comprises a material selected from artificial graphite, a composite negative electrode material that includes metallic silicon, a composite of a silicon oxide/metallic silicon powder coated with conductive carbon and a graphitic powder coated with conductive carbon.

16. The lithium secondary battery according to claim 14, wherein the separator is selected from a synthetic resin film, and a separator formed of fibers or inorganic fibers, or wherein the separator is selected from a polyethylene film, a polypropylene film, a polyethylene woven fabric, a polyethylene nonwoven fabric, a polypropylene woven fabric, a polypropylene nonwoven fabric, a separator formed of glass fibers, a separator formed of cellulose fibers, and a separator formed of polyethylene terephthalate fibers.

17. The lithium secondary battery according to claim 14, wherein the electrolyte is a non-aqueous electrolyte solution which includes a non-aqueous solvent and at least one lithium salt, or an ion-conductive polymer.

18. The lithium secondary battery according to claim 17, wherein the non-aqueous solvent is an alkyl carbonate or a mixture of alkyl carbonates.

19. The lithium secondary battery according to claim 18, wherein the non-aqueous solvent is selected from ethylene carbonate (EC), propylene carbonate (PC), diethyl carbonate (DEC), dimethyl carbonate (DMC), methylethyl carbonate (MEC), and combinations thereof.

20. The lithium secondary battery according to claim 17, wherein the lithium salt is selected from lithium hexafluorophosphate ($LiPF_6$), lithium tetrafluoroborate ($LiBF_4$), and lithium trifluoromethanesulfonate ($LiSO_3CF_4$).

21. A method for the manufacture of a positive electrode material as defined in claim 1, comprising the steps of:
   a) providing particles of the first lithium compound;
   b) forming the first carbon material layer on the entire surface of the particles provided in (a), to provide carbon-coated particles;
   c) forming a thin film layer of the second lithium compound on part or the entirety of the carbon-coated particles provided in step (b); and
   d) coating an entire surface of the thin film layer of the second lithium compound with the second carbon material layer, to provide the positive electrode material.

22. The method of claim 21, further comprising mixing the material of step (d) with a conductive carbon material, and fusion bonding the conductive carbon material and the second carbon material layer.

23. The method of claim 21, further comprising mixing the particle provided in step (a) with a compound comprising an element selected from the elements of groups 3 to 6 in the periodic table, or an oxide thereof, or an aluminum halide compound.

24. The positive electrode of claim 13, wherein the binder is a fluorine-containing resin selected from the group consisting of polytetrafluoroethylene, polyvinylidene fluoride, and fluororubber, and combinations thereof.

25. The positive electrode of claim 13, wherein the binder is a thermoplastic resin selected from the group consisting of polypropylene and polyethylene, and combinations thereof.

26. The positive electrode material according to claim 1, wherein the average particle size of the first lithium compound particles ranges from about 3 to about 15 µm.

27. The positive electrode material according to claim 1, wherein the thickness of the of the first carbon material layer ranges from about 1 nm to about 10 nm.

28. The positive electrode material according to claim 1, wherein the thickness of the thin-film layer of the second lithium compound is within about 50 nm to about 300 nm.

* * * * *